(12) United States Patent
Ahn et al.

(10) Patent No.: US 8,958,317 B2
(45) Date of Patent: Feb. 17, 2015

(54) METHOD AND APPARATUS FOR PERFORMING RANDOM ACCESS IN A MULTI-CARRIER SYSTEM

(75) Inventors: Seung Jin Ahn, Anyang-si (KR); Sang Woo Kim, Anyang-si (KR); Sang Won Kwon, Anyang-si (KR); Won Yong Yoon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 350 days.

(21) Appl. No.: 13/132,814

(22) PCT Filed: Dec. 3, 2009

(86) PCT No.: PCT/KR2009/007203
§ 371 (c)(1),
(2), (4) Date: Jun. 3, 2011

(87) PCT Pub. No.: WO2010/064858
PCT Pub. Date: Jun. 10, 2010

(65) Prior Publication Data
US 2011/0235609 A1 Sep. 29, 2011

Related U.S. Application Data

(60) Provisional application No. 61/119,727, filed on Dec. 4, 2008.

(51) Int. Cl.
*H04L 12/28* (2006.01)
*H04W 74/00* (2009.01)
*H04L 5/00* (2006.01)

(52) U.S. Cl.
CPC ........... *H04W 74/002* (2013.01); *H04L 5/0007* (2013.01); *H04L 5/0053* (2013.01); *H04L 5/0091* (2013.01); *H04L 5/0094* (2013.01)
USPC ............ 370/252; 370/329; 370/389; 370/431

(58) Field of Classification Search
CPC . H04L 5/001; H04L 5/0053; H04W 72/0413; H04W 72/042; H04W 72/0453; H04W 72/04; H04W 72/0406; H04W 24/10
USPC ......... 370/252, 254, 255, 328, 329, 330, 331, 370/395.31, 389, 390, 392, 431, 432, 445
See application file for complete search history.

(56) References Cited

U.S. PATENT DOCUMENTS

| | | | |
|---|---|---|---|
| 7,013,146 B2 | 3/2006 | Wang et al. | |
| 2004/0071194 A1 | 4/2004 | Suwa et al. | |
| 2005/0163086 A1 | 7/2005 | Kang | |
| 2007/0217440 A1* | 9/2007 | Cho et al. | 370/431 |
| 2010/0009688 A1 | 1/2010 | Lim et al. | |

(Continued)

FOREIGN PATENT DOCUMENTS

| | | | |
|---|---|---|---|
| KR | 10-0788901 A | 12/2007 |
| WO | WO 2007/083230 A2 | 7/2007 |

*Primary Examiner* — Yemane Mesfin
*Assistant Examiner* — Mon Cheri Davenport
(74) *Attorney, Agent, or Firm* — Birch, Stewart, Kolasch & Birch, LLP

(57) ABSTRACT

A method of a user equipment performing random access in a multi-carrier system comprises receiving mapping information through downlink component carriers, sending a random access preamble through uplink component carriers, and receiving a random access response through a specific downlink component carriers determined based on the mapping information.

7 Claims, 13 Drawing Sheets

(56) References Cited

U.S. PATENT DOCUMENTS

| | | | |
|---|---|---|---|
| 2010/0165943 A1* | 7/2010 | Kato et al. | 370/329 |
| 2010/0296467 A1* | 11/2010 | Pelletier et al. | 370/329 |
| 2011/0096748 A1* | 4/2011 | Meyer et al. | 370/329 |
| 2012/0269136 A1* | 10/2012 | Seo et al. | 370/329 |

* cited by examiner

METHOD AND APPARATUS FOR PERFORMING RANDOM ACCESS IN A MULTI-CARRIER SYSTEM

This application is the National Phase of PCT/KR2009/007203 filed on Dec. 3, 2009, which claims priority under 35 U.S.C. 119(e) to U.S. Provisional Application No. 61/119,727 filed on Dec. 4, 2008, all of which are hereby expressly incorporated by reference into the present application.

TECHNICAL FIELD

The present invention relates to wireless communication and, more particularly, to a method and apparatus for performing random access in a wireless communication system supporting multiple carriers.

BACKGROUND ART

Wireless communication systems are being widely deployed in order to provide various kinds of communication services, such as voice or data. In general, a wireless communication system is a multiple access system which can support communication with multiple users by sharing available radio resources (bandwidth, transmission power, etc.). The multiple access systems may include, for example, a Time Division Multiple Access (TDMA) system, a Code Division Multiple Access (CDMA) system, a Frequency Division Multiple Access (FDMA) system, an Orthogonal Frequency Division Multiple Access (OFDMA) system, and a Single Carrier Frequency Division Multiple Access (SC-FDMA) system.

One or more cells are deployed in one base station included in the wireless communication system. A number of user equipments can be placed in one cell. In order for such a user equipment (UE) to access a network, the UE experiences a random access procedure. The random access procedure is performed through a Random Access Channel (RACH) (i.e., an uplink transmission channel).

The random access procedure can be classified into a contention-based random access procedure and a non-contention-based random access procedure. The random access procedure is schematically described below. When a UE sends a random access preamble, a base station sends a random access response to the UE. The UE sends a scheduled message to a network. The purpose of the UE to perform a random access procedure for a network can include initial access, handover, a scheduling request, timing alignment, and so on.

A conventional wireless communication system, in general, uses one bandwidth in order to send data. For example, the $2^{nd}$ generation wireless communication system uses the bandwidth of 200 kHz to 1.25 MHz, and the $3^{rd}$ wireless communication system uses the bandwidth of 5 MHz to 10 MHz. TO support an increasing capacity of data transmitted and received, a recent 3GPP LTE or 802.16m continues to extend its bandwidth up to 20 MHz or more. To extend the bandwidth in order to increase the capacity of data transmitted and received may be indispensable. However, to support a great bandwidth even when a required quality of service is low may result in high power consumption.

Therefore, there is emerging a multi-carrier system which is capable of defining a carrier having one bandwidth and a central frequency and transmitting and/or receiving data using a broadband through a plurality of carriers. Both a narrow band and a broadband are supported using one or more carriers. For example, if a single carrier corresponds to the bandwidth of 20 MHz, the bandwidth of 40 MHz can be supported using two carriers.

In such a multi-carrier system, in the case in which the random access procedure is performed, how the random access procedure will be performed according to which method becomes problematic when a number of carriers exist. For example, it may be problematic how the UE will send a random access preamble through which uplink carrier and will receive a random access response through which downlink carrier.

DISCLOSURE OF INVENTION

Technical Problem

Accordingly, the present invention has been made keeping in mind the above problems occurring in the prior art, and an object of the present invention is to provide a method and apparatus for performing random access in a multi-carrier system.

Technical Solution

A method of a user equipment performing random access according to an aspect of the present invention comprises receiving mapping information through downlink component carriers, sending a random access preamble through uplink component carriers, and receiving a random access response through a specific one of the downlink component carriers determined based on the mapping information.

A user equipment according to another aspect of the present invention comprises a Radio Frequency (RF) unit configured to send or receive a radio signal, and a processor connected to the RF unit. The processor is configured to receive mapping information through a broadcast channel included in downlink component carriers, send a random access preamble through uplink component carriers, and receive a random access response through a specific one of the downlink component carriers determined based on the mapping information.

Advantageous Effects

In a multi-carrier system, a UE can know through which carrier a random access preamble and a random access response are transmitted. Accordingly, the time that it takes to perform random access can be reduced because all of carriers need not to be decoded.

Furthermore, backward compatibility between an existing wireless communication system using only a single carrier and a multi-carrier system can be maintained.

MODE FOR THE INVENTION

Some embodiments of the present invention will now be described in detail with reference to the accompanying drawings.

The following technology can be used for a variety of wireless access systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM), General Packet Radio Service (GPRS), and Enhanced Data Rates for GSM Evolution (EDGE). OFDMA may be implemented using radio technology, such as IEEE 802.11 (Wi-Fi), IEEE 802.16 (WiMAX), IEEE 802-20, and Evolved UTRA (E-UTRA). UTRA is part of a Universal Mobile Telecommunications System (UMTS). $3^{rd}$ Generation Partnership Project (3GPP) Long Term Evolution (LTE) is part of Evolved UTMS (E-UMTS) using E-UTRA and is configured to adopt OFDMA in the downlink and SC-FDMA in the uplink. 3GPP LTE is the evolution of 3GPP LTE.

In order to clarify a description, the 3GPP LTE/LTE-A is chiefly described, but the present invention is not limited to the 3GPP LTE/LTE-A.

Figure 1:
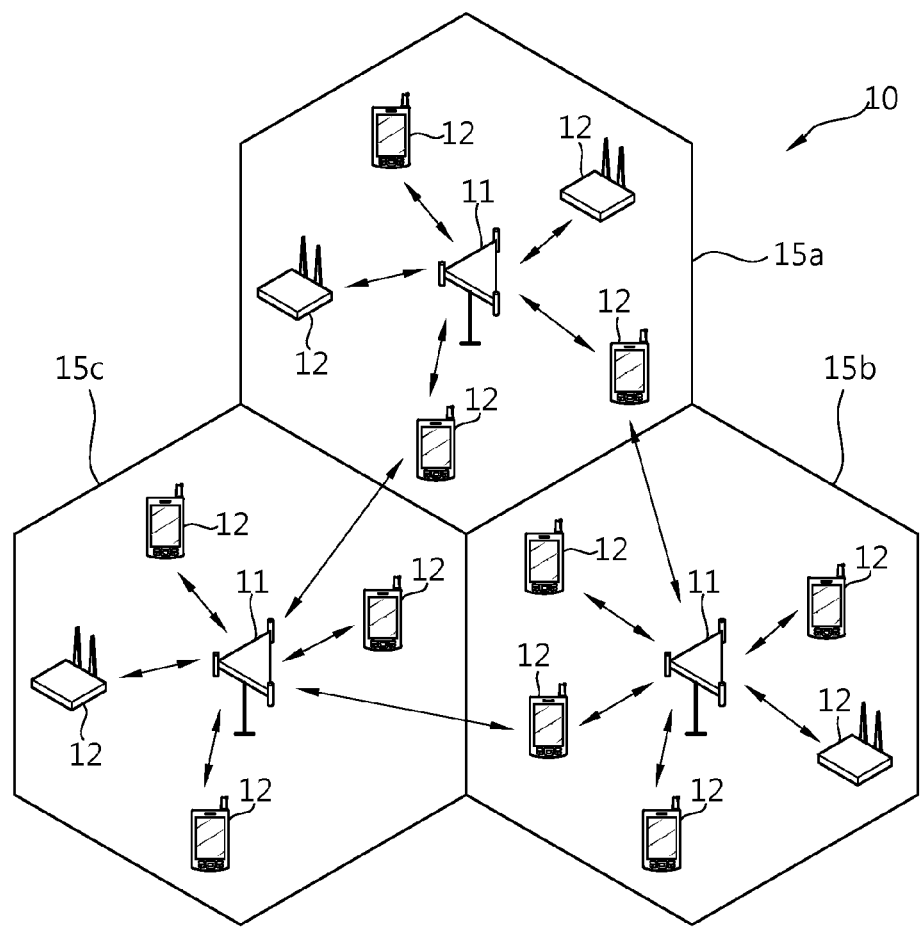
FIG. 1 is a diagram showing a wireless communication system.

FIG. 1 shows a wireless communication system. The wireless communication system 10 includes one or more Base Stations (BSs) 11. Each of the BSs 11 provides communication services to a specific geographical area (in general, called a 'cell') 15a, 15b, or 15c. Each of the cells can be classified into a number of areas (called 'sectors'). The BS 11, in general, refers to a fixed station which communicates with User Equipments (UEs) 12, and it may be referred to as another terminology, such as an evolved-NodeB (eNB), a Base Transceiver System (BTS), or an access point.

The UE 12 can be fixed and mobility and can be referred to as another terminology, such as a Mobile Station (MS), a User Terminal (UT), a Subscriber Station (SS), a wireless device, a Personal Digital Assistant (PDA), a wireless modem, or a handheld device.

Hereinafter, downlink (DL) refers to communication from a base station to a user equipment, and uplink (UL) refers to communication from a user equipment to a base station. In the downlink, a transmitter can be part of a base station and a receiver can be part of a user equipment. In the uplink, a transmitter can be part of a user equipment and a receiver can be part of a base station.

Figure 2:
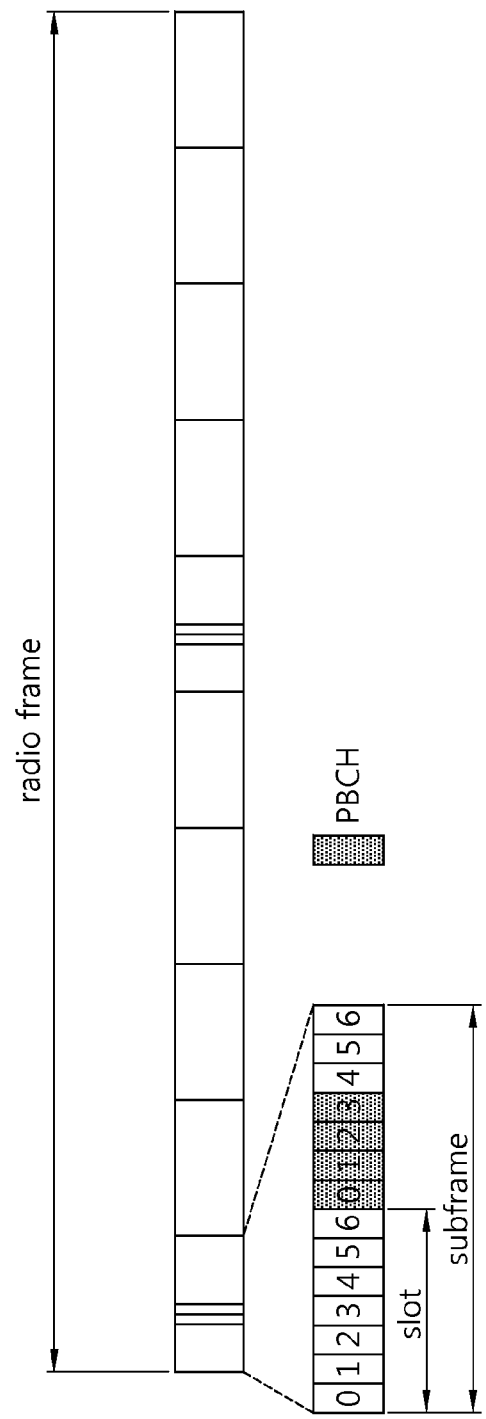
FIG. 2 is a diagram showing the structure of a radio frame in 3GPP LTE.

FIG. 2 shows the format of a radio frame in 3GPP LTE. For the format of a radio frame, reference can be made to Section 6 of 3GPP TS 36.211 V8.4.0 (2008-09). The radio frame includes 10 subframes, and one subframe includes two slots. The time that it takes to send one subframe is called a Transmission Time Interval (TTI). For example, the length of one subframe can be 1 ms, and the length of one slot can be 0.5 ms.

One slot can include a plurality of OFDM symbols in the time domain. The OFDM symbol is for representing one symbol period because 3GPP LTE uses OFDMA in the downlink. The OFDM symbol can also be called other name according to a multiple access method. For example, in the case in which SC-FDMA is used according to an uplink multiple access method, the OFDM symbol may be called an SC-FDMA symbol. A single slot is illustrated to include 7 OFDM symbols, but the number of OFDM symbols included in one slot may be changed according to the length of a Cyclic Prefix (CP). In accordance with 3GPP TS 36.211, one slot includes 7 OFDM symbols in a normal CP, and one slot includes 6 OFDM symbols in an extended CP. The format of the radio frame shown in FIG. 2 is only illustrative, and the number of subframes included in the radio frame and the number of slots included in a subframe may be changed in various ways.

A Physical Broadcast Channel (PBCH) is transmitted in front four OFDM symbols of the second slot of the first subframe of the radio frame. The PBCH carries system information which is indispensably required by a user equipment to communicate with a base station. The system information transmitted through the PBCH is called a Master Information Block (MIB).

Figure 3:
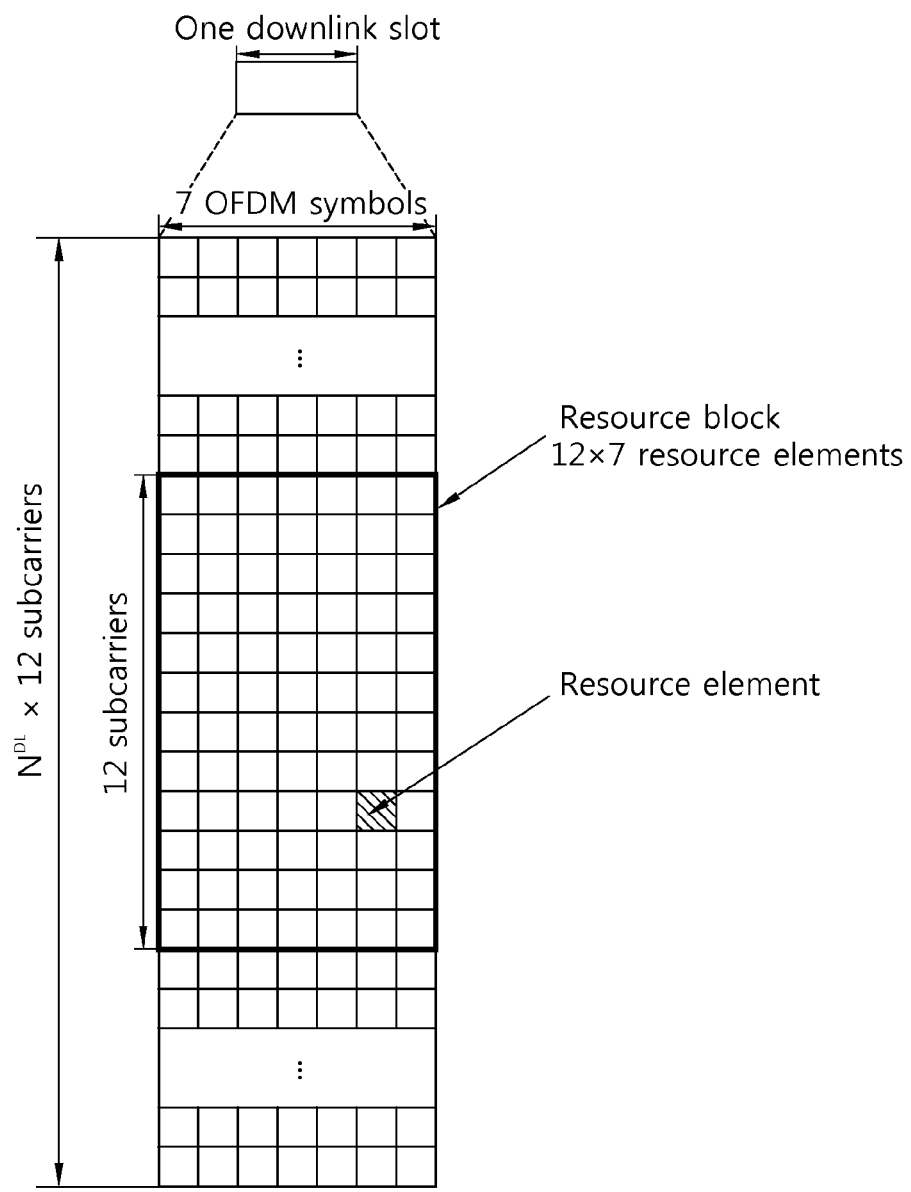
FIG. 3 is an exemplary diagram showing a resource grid for one downlink slot.

FIG. 3 is an exemplary diagram showing a resource grid for one downlink slot. A downlink slot includes a plurality of OFDM symbols in the time domain. In FIG. 3, one downlink slot is illustrated to include 7 OFDM symbols, and one resource block is illustrated to include 12 subcarriers in the frequency domain. However, the present invention is not limited to the above example. Each element on the resource grid is called a resource element, and one resource block includes 12×7 resource elements. The number of resource blocks NAL, included in a downlink slot, depends on a downlink transmission bandwidth set in a cell.

A method of a user equipment to perform a random access procedure in a wireless communication system is described below. First, in the following case, the user equipment can perform the random access procedure for a base station.

(1) case in which the user equipment performs initial access because the user equipment has not RRC connection to the base station, (2) case in which the user equipment first accesses a target cell in a handover process, (3) case in which the random access procedure is requested by a command from the base station, (4) case in which uplink data are generated in the state in which timing alignment of the uplink is not performed or uplink radio resources are not assigned, (5) case in which a recovery process, such as in a radio link failure or a handover failure, is performed.

The random access procedure includes two kinds; the contention-based random access procedure and the non-contention-based random access procedure. Here, the term 'contention' refers to that two or more user equipments attempt the random access procedure using the same random access preamble through the same resources.

Figure 4:
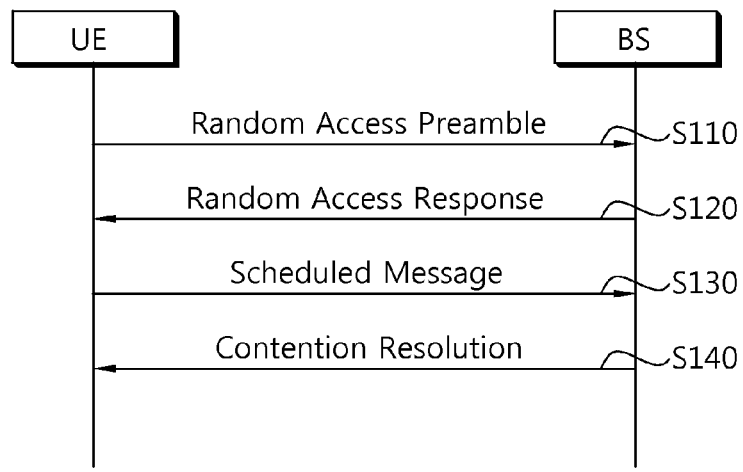
FIG. 4 is a flowchart illustrating a contention-based random access procedure.

FIG. 4 is a flowchart illustrating the contention-based random access procedure.

Referring to FIG. 4, at step S110, a user equipment arbitrarily selects one random access preamble in a random access preamble set and sends the selected random access preamble to a base station through PRACH resources. Information about the configuration of the random access preamble set can be obtained from the base station through part of system information or a handover command message.

At step S120, the user equipment attempts to receive its own random access response within a random access response reception window. The random access response reception window can be instructed through part of the system information or the handover command message and is used to monitor a random access response. In more detail, the random access response is transmitted in the form of a Medium Access Control (MAC) Protocol Data Unit (PDU). The MAC PDU is sent through a PDSCH (i.e., a physical channel). Allocation information about the PDSCH is acquired through a PDCCH (i.e., a control channel). The PDCCH carries information about a user equipment that will receive the PDSCH, radio resource assignment information about the PDSCH, a transmission format of the PDSCH, and so on. A user equipment first monitors a PDCCH within a subframe belonging to a random access response reception window and, if it is successful in receiving the PDCCH, receives a random access response on a PDSCH indicted by the PDCCH.

The random access response includes a Timing Alignment (TA) value for uplink synchronization of a user equipment, uplink radio resource assignment information, a Random Access Preamble Identifier (RAPID) for identifying user equipments that perform random access, and a temporary identifier for a user equipment, such as a temporary Cell-Radio Network Temporary Identity (C-RNTI). The RAPID is used to identify a received random access preamble.

At step S130, the user equipment sends a scheduled message, including a random access identifier, to the base station based on the timing alignment value and the uplink radio resource assignment information.

The base station uses the random access identifier to distinguish between user equipments that perform a random access procedure. The random access identifier can be obtained through two kinds of methods. In the first method, if a user equipment already has a valid cell identifier (for example, C-RNTI) assigned by a corresponding cell before a random access procedure, the user equipment uses the cell identifier as the random access identifier. In the second method, if a user equipment is not assigned with a valid cell identifier before a random access procedure, the user equipment uses its unique identifier (SAE Temporary Mobile Station Identifier (S-TMSI)) or an upper layer identifier as the random access identifier. The user equipment starts a contention resolution timer by sending the scheduled message.

At step S140, after receiving the scheduled message, the base station sends a contention resolution message, including the random access identifier, to the user equipment.

In the contention-based random access procedure, contention occurs because the number of available random access preambles is limited. Since unique random access preambles cannot be assigned to all user equipments within a cell, a user equipment arbitrarily selects one random access preamble from a random access preamble set and sends the selected random access preamble. Accordingly, two or more user equipments can select and send the same random access preamble through the same PRACH resources. This is because contention is generated. A base station that has received the random access preamble sends a random access response in the state in which the base station does not know whether contention has occurred. However, since contention has occurred, the two or more user equipments receive the same random access response, and the user equipments sends respective scheduled messages to the base station based on information included in the random access response. It is meant that the two or more user equipments send different scheduled messages through same uplink radio resource indicated by the random access response. In this case, such transmission of the scheduled messages is all failed, or only the scheduled message of a specific user equipment is successfully received by the base station according to the position or transmission power of the user equipments. In the case in which the base station has successfully received the scheduled message, the base station sends a contention resolution message using a random access identifier included in the scheduled message. The corresponding user equipment that has received its own random access identifier can know that contention resolution is successful. In the contention-based random access procedure, to let a user equipment to know whether contention is a failure or a success is called contention resolution.

Figure 5:
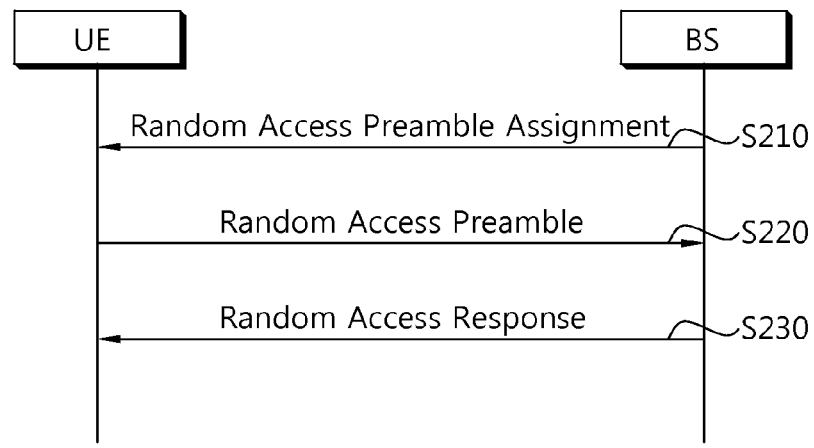
FIG. 5 is a flowchart illustrating a non-contention-based random access procedure.

FIG. 5 is a flowchart illustrating a non-contention based random access procedure.

Referring to FIG. 5, at step S210, a base station assigns a dedicated random access preamble to a user equipment. For a non-contention-based random access procedure, a dedicated random access preamble that has no possibility of contention needs to be assigned by a base station. The dedicated random access preamble can be included in a handover command message or can be transmitted on a PDCCH. In the case in which a random access procedure is performed during a handover process, a user equipment can obtain a dedicated random access preamble from the handover command message. In the case in which a random access procedure is performed at the request of a base station, a user equipment can obtain a dedicated random access preamble through a PDCCH.

At step S220, the user equipment sends the dedicated random access preamble to the base station through PRACH resources.

At step S230, the user equipment receives a random access response corresponding to the dedicated random access preamble. In the non-contention based random access procedure, if a random access response is received then it is determined that the random access procedure has successfully been performed and so terminated.

The biggest difference between the contention-based random access procedure and the non-contention based random access procedure is whether a random access preamble is exclusively assigned to one user equipment. In the non-contention based random access procedure, contention (or collision) does not occur between two user equipments because only one of the user equipments uses a dedicated random access preamble assigned thereto. In the contention-based random access procedure, there is a possibility of contention because a user equipment uses an arbitrarily selected random access preamble. The non-contention-based random access procedure can be used only when it is requested during a handover process or by a command from a base station, from among the random access cases.

Such a random access procedure can be applied to a multi-carrier system.

First, the multi-carrier system is described.

An existing 3GPP LTE system supports a case in which a downlink bandwidth and an uplink bandwidth are differently set only in the case of a single carrier. That is, the 3GPP LTE system supports only a case in which the bandwidth of the downlink is different from the bandwidth of the uplink in the state in which a single carrier is defined to each of the downlink and the uplink. For example, the 3GPP LTE system supports a maximum of 20 MHz and supports only a single carrier in the uplink and the downlink although an uplink bandwidth and a downlink bandwidth can differ.

Meanwhile, the multi-carrier system supports a carrier aggregation. A carrier aggregation is an aggregation of a plurality of narrow band carriers which can construct a broadband. A carrier aggregation can support the throughput which is increased through the extension of a transmission bandwidth, prevent an increase in the cost resulting from a broadband Radio Frequency (RF) device, and guarantee compatibility with an existing system. In the extension of a transmission bandwidth, for example, five carriers are assigned as the granularity of a carrier unit having a bandwidth of 20 MHz, a maximum of 100 MHz bandwidth can be supported.

A carrier aggregation can be divided into a contiguous carrier aggregation in which an aggregation is performed between continuous carriers in the frequency domain and a non-contiguous carrier aggregation in which an aggregation is performed between discontinuous carriers in the frequency domain. The non-contiguous carrier aggregation is also called a spectrum aggregation.

Carriers used in the carrier aggregation can have the same bandwidth or different bandwidths. For example, two 20 MHz carriers can be used to construct a 40 MHz band. Alternatively, one 20 MHz carrier and two 10 MHz carriers can be used to construct a 40 MHz band.

Furthermore, a total bandwidth used in the uplink can be equal to or different from a total bandwidth used in the downlink. For example, three 20 MHz carriers (i.e., a total bandwidth of 60 MHz) can be used in the uplink, and five 20 MHz carriers (i.e., a total bandwidth of 100 MHz) can be used in the downlink.

Different Radio Access Technologies (RAT) can be applied to carriers. For example, 3GPP LTE can be applied to first and second carriers, and IEEE 802.16 or 3GPP LTE-A can be applied to a third carrier.

Hereinafter, a multi-carrier system refers to a system which can support a plurality of carriers based on a carrier aggregation.

Figure 6:
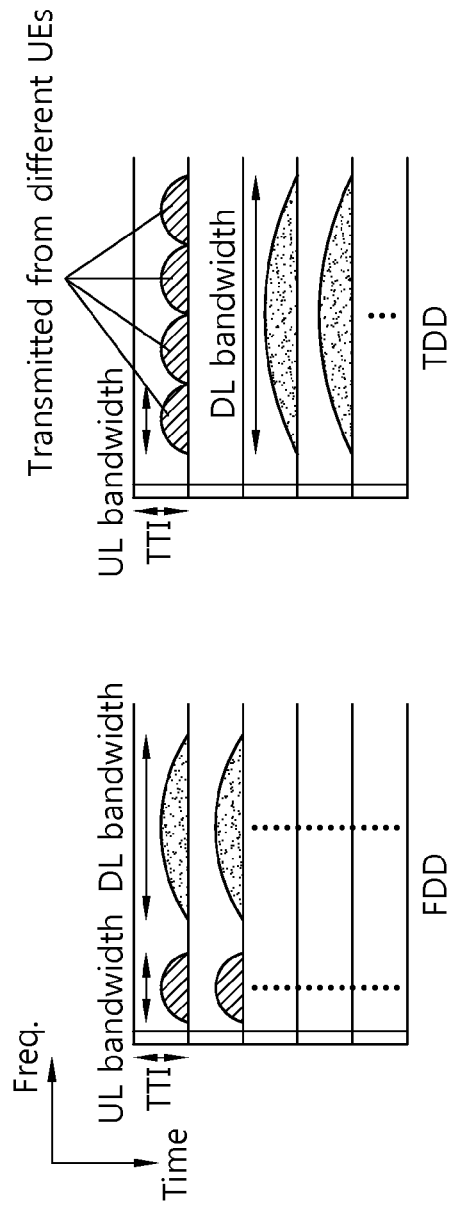
FIG. 6 shows an example of a structure in which the bandwidths of the uplink and the downlink are asymmetrically configured in Frequency Division Duplex (FDD) and Time Division Duplex (TDD) in a multi-carrier system.

FIG. 6 shows an example of a structure in which the bandwidths of the uplink and the downlink are asymmetrically configured in the Frequency Division Duplex (FDD) and Time Division Duplex (TDD) in the multi-carrier system. FDD refers to that uplink transmission and downlink transmission are performed in different frequency bands, and TDD refers to that uplink transmission and downlink transmission are performed in different TTIs (or time slots or subframes). In FDD, although a downlink bandwidth is greater than an uplink bandwidth, the uplink bandwidth may be greater than the downlink bandwidth. A number of carriers can be used in each of the downlink and uplink bandwidths. In TDD, four carriers are used in an uplink bandwidth, and a single carrier is used in a downlink bandwidth.

Figure 7:
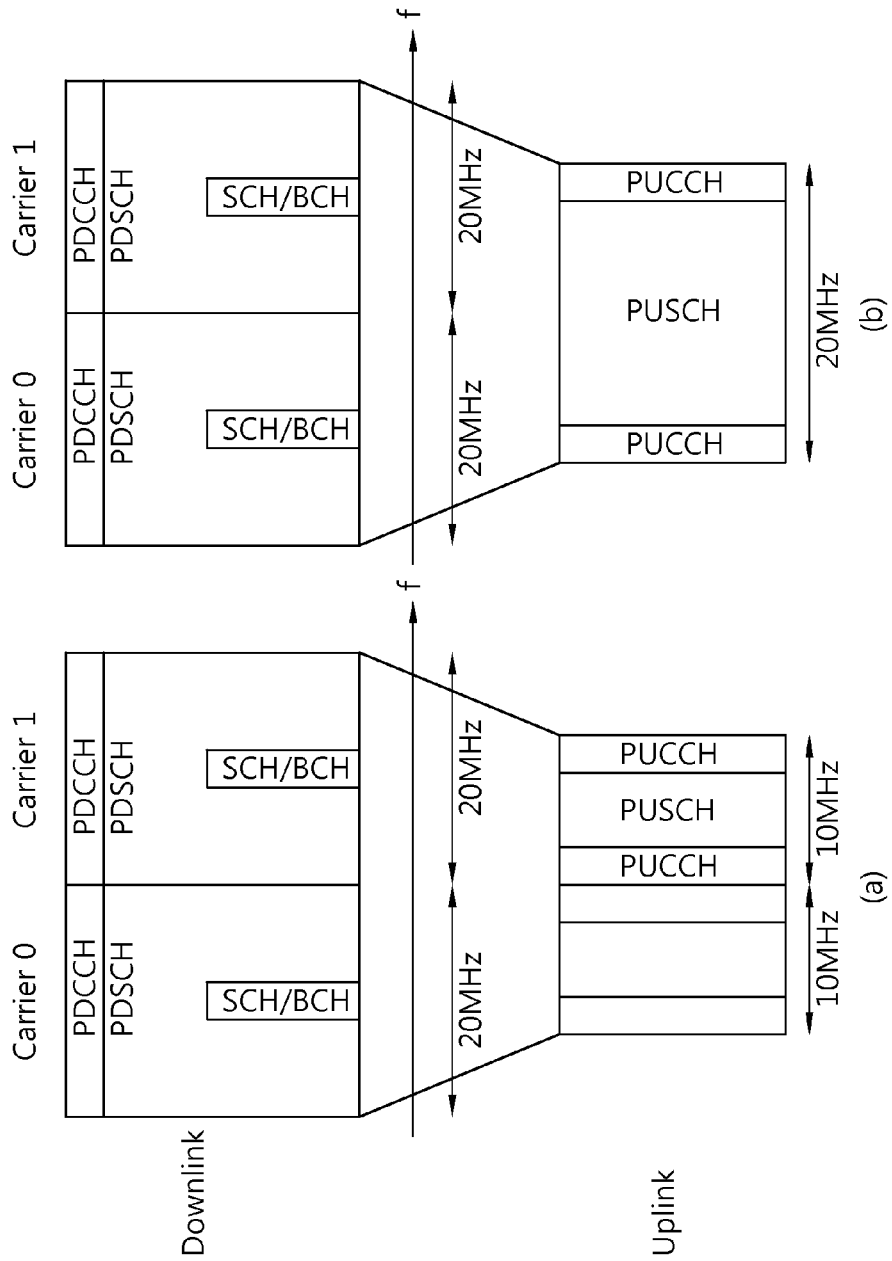
FIG. 7 shows another example of uplink and downlink structures in a multi-carrier system.

FIG. 7 shows another example of uplink and downlink structures in a multi-carrier system. (a) of FIG. 7 shows a case in which the number of uplink carriers and the number of downlink carriers are equal to each other (i.e., 2), but the bandwidth (10 MHz) of the uplink carrier is different from the bandwidth (20 MHz) of the downlink carrier. (b) of FIG. 7 shows a case in which the number of uplink carriers is different from the number of downlink carriers, but the bandwidth of the uplink carrier and the bandwidth of the downlink carrier are equal to each other (i.e., 20 MHz).

In the case in which a random access procedure is performed in a multi-carrier system, there is something to be considered. As described above, in the multi-carrier system, a plurality of carriers is aggregated to constitute one broadband for the purpose of a reduction in the cost and backward compatibility with an existing system. In this case, how the random access procedure will be performed through which carrier is problematic. For example, in the case in which a UE (User Equipment) sends a random access preamble, which carrier will be used by the UE can become problematic. For another example, in the case in which a UE receives a random access response, which carrier will be used by the UE can become problematic. For convenience sake, it is assumed that a carrier used in a multi-carrier system is hereinafter a component carrier. It is also assumed that a carrier transmitted from a base station to a user equipment is a downlink component carrier (DL_CC), and a carrier transmitted from a user equipment to a base station is an uplink component carrier (UL_CC).

Figure 8:
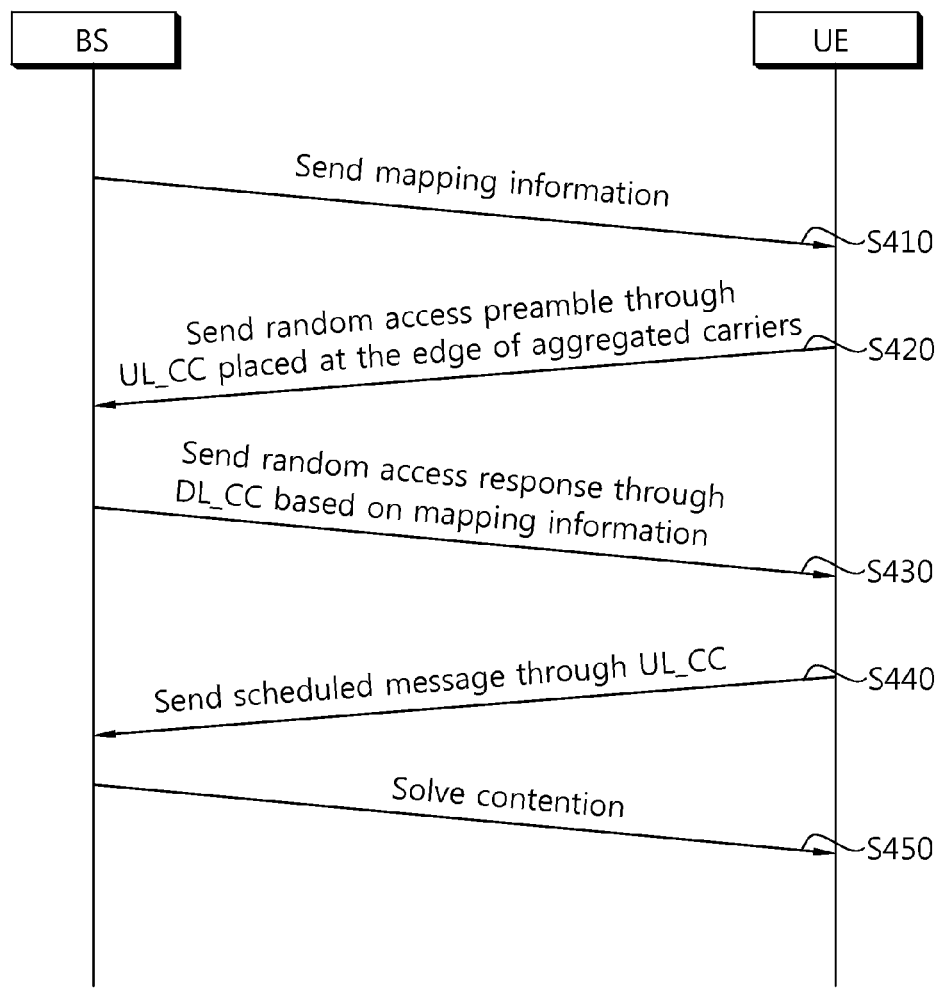
FIG. 8 shows a method of performing random access according to an embodiment of the present invention.

FIG. 8 shows a method of performing random access according to an embodiment of the present invention.

Referring to FIG. 8, a base station sends mapping information to a user equipment through a broadcast channel (BCH) at step S410. The mapping information can include information about a mapping relationship between an uplink component carrier (hereinafter referred to as an UL_CC) and a downlink component carrier (hereinafter referred to as a DL_CC). For example, the mapping information can include information about a mapping relationship between an UL_CC on which a random access preamble is transmitted and a DL_CC on which a random access response is transmitted. Further, the mapping information can selectively include information about an UL_CC on which a user equipment can send a random access preamble. Furthermore, a base station can send information about the number of UL_CCs and the frequency band of an UL_CC through the BCH. The BCH can be sent by each DL_CC.

A user equipment that has to perform a random access procedure can know the number of UL_CCs or the frequency band of an UL_CC or both by decoding the BCH included in any DL_CC and can also know a UL_CC on which a random access preamble will be transmitted and a DL_CC on which a random access response will be received.

For example, the user equipment can send a random access preamble to the base station through an UL_CC placed at the highest frequency band or an UL_CC placed at the lowest frequency band or both according to the number of UL_CCs which have been acquired by decoding the BCH at step S420. An UL_CC on which the random access preamble is transmitted can be expressed as an UL_CC located at the edge of aggregated carriers in respect of the frequency domain. Here, in the case in which a number of component carriers are aggregated to form a broadband, the aggregated carriers refer to carriers having the broadband as a frequency band.

The user equipment sends the random access preamble, arbitrarily selected from a random access set to which a number of random access preambles belong, to the base station through a Physical Random Access Channel (PRACH) at an UC_CC placed at the edge of the aggregated carriers. The random access set can include 64 random access preambles.

Alternatively, the user equipment may send the random access preamble through an UL_CC which is indicated by information about an UL_CC included in mapping information. Information about the UL_CC on which the random access preamble can be transmitted can be given in the form of a bitmap and the bitmap can be given in N bits when the number of UL_CCs is N. Alternatively, 2-bit information can be given for two UL_CCs placed at the edges of aggregated carriers.

When the random access preamble is received, the base station sends a random access response to the user equipment through a Downlink Shared Channel (DL-SCH) of a DL_CC which has been known to the user equipment through the mapping information at step S430. In this case, the random access response can include timing alignment information for timing alignment correction toward the uplink, a random access preamble identifier, a temporary Cell-Radio Network Temporary Identifier (C-RNTI), UL_CC information, uplink radio resource assignment information, and so on. The timing alignment information is information which is used by a user equipment to control uplink synchronization. The random access preamble identifier is an identifier for the random access preamble received by the base station. The random access response can be identified by a random access identifier (i.e., a Random Access-Radio Network Temporary Identifier (RA-RNTI)) on the PDCCH transmitted by the base station. The UL_CC information is information indicating an UL_CC on which the user equipment will send a scheduled message (for example, an RRC connection request message) to the base station. Such UL_CC information can be selectively included in the random access response.

The user equipment has already known a DL_CC on which the random access response will be received based on the mapping information. Accordingly, the user equipment does not need to check whether a random access response intended for the user equipment has been received through the RA-RNTI by decoding all DL_CCs. That is, the user equipment can check whether the random access response intended for the user equipment has been received by decoding only a DL_CC mapped to the UL_CC on which the random access preamble has been transmitted. Accordingly, the time that a user equipment takes to perform a random access procedure can be reduced.

The user equipment sends a scheduled message (for example, an RRC connection request message) to the base station at step S440. In this case, the RRC connection request message can be transmitted through an UL_CC which is indicated by UL_CC information included in the random access response. The user equipment can send the RRC connection request message to the base station through an Uplink Shared Channel (UL-SCH), assigned to the UL_CC, based on uplink radio resource assignment information included in the random access response.

If the UL_CC information is not included in the random access response, the user equipment may send a scheduled message through the UL_CC on which the random access preamble has been transmitted.

After receiving the scheduled message, the base station sends a contention resolution message, including the random access identifier, to the user equipment at step S450.

Figure 9:
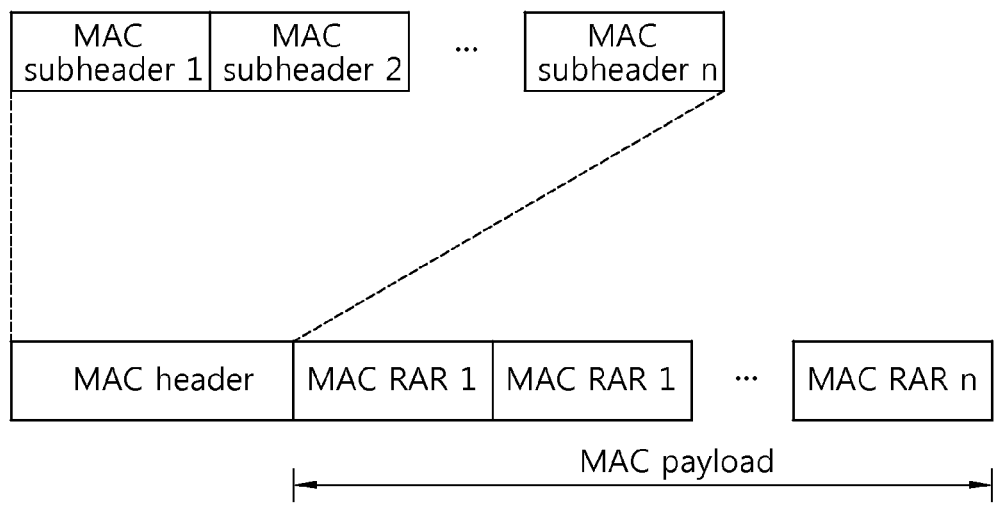
FIG. 9 shows a Medium Access Control (MAC) Protocol Data Unit (PDU) structure used in a random access response.

FIG. 9 shows a Medium Access Control (MAC) Protocol Data Unit (PDU) structure used in a random access response. The MAC PDU includes a MAC header and a MAC payload. The MAC header can include at least one MAC subheader. The MAC subheader is divided into a Backoff Indicator (BI) MAC subheader and a Random Access Preamble Identifier (RAPID) MAC subheader used to distinguish between random access preambles. The RAPID MAC subheader is used to identify a random access preamble. Each RAPID MAC subheader corresponds to one MAC Random Access Response (MAC RAR). The BI MAC subheader includes information for identifying when next random access will be attempted. The MAC payload includes at least one MAC RAR.

Figure 10:
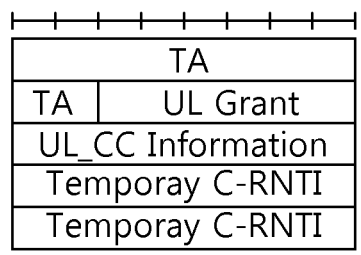
FIG. 10 shows a Random Access Response (MAC RAR)

FIG. 10 shows a random access response (MAC RAR).

The MAC RAR includes various pieces of information through a plurality of fields. A Time Alignment (TA) field indicates alignment necessary for uplink transmission timing used for timing synchronization. An UL grant field indicates uplink radio resource assignment information. UL_CC information indicates an UL_CC (uplink component carrier) on which a user equipment will send an RRC connection request message to a base station. A temporary C-RNTI indicates a temporary identifier used by a user equipment during random access.

Figure 11:
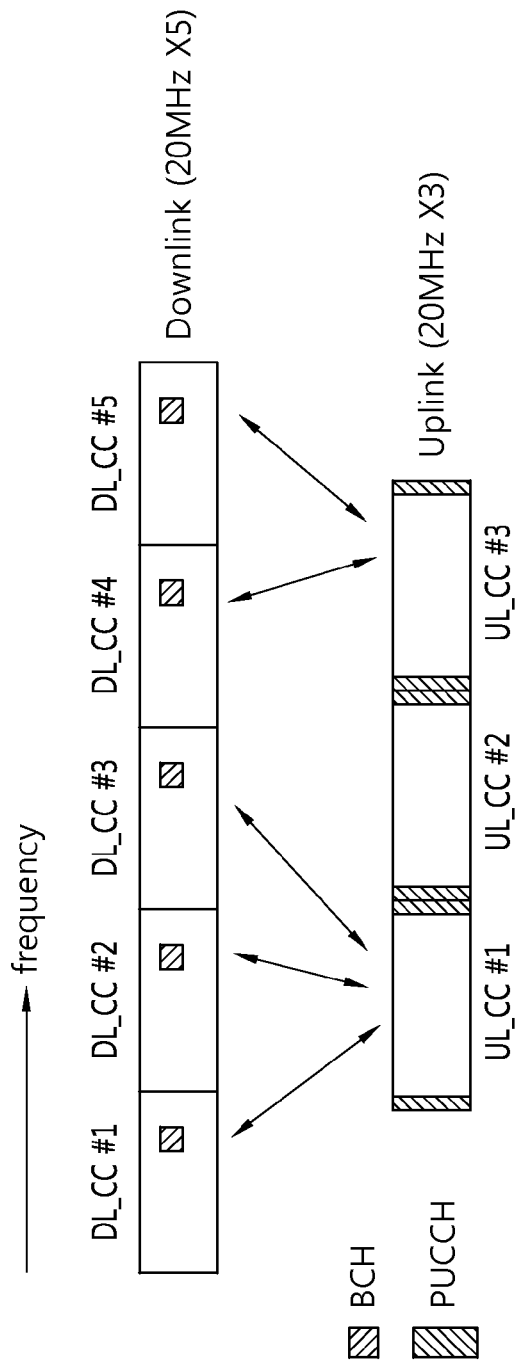
FIG. 11 shows an example in which uplink component carriers and downlink component carriers are mapped in a random access procedure.

FIG. 11 shows an example in which UL_CCs and DL_CCs are mapped in the random access procedure.

Referring to FIG. 11, the number of UL_CC is 3, and the number of DL_CCs is 5. An UL_CC #1 to an UL_CC #3 constitutes aggregated carriers. In this case, as described above, a user equipment can send a random access preamble to a base station through the UL_CC #1 or the UL_CC #3 or both which are placed at the edges of the aggregated carriers in the frequency domain.

DL_CCs #1, #2, and #3 on which a random access response is transmitted can be mapped to an UL_CC #1, and DL_CCs #4 and #5 on which a random access response is transmitted can be mapped to an UL_CC #3. One UL_CC and one DL_CC can be mapped to each other, but, as in the present embodiment, a number of DL_CCs can be mapped to one UL_CC.

Figure 12:
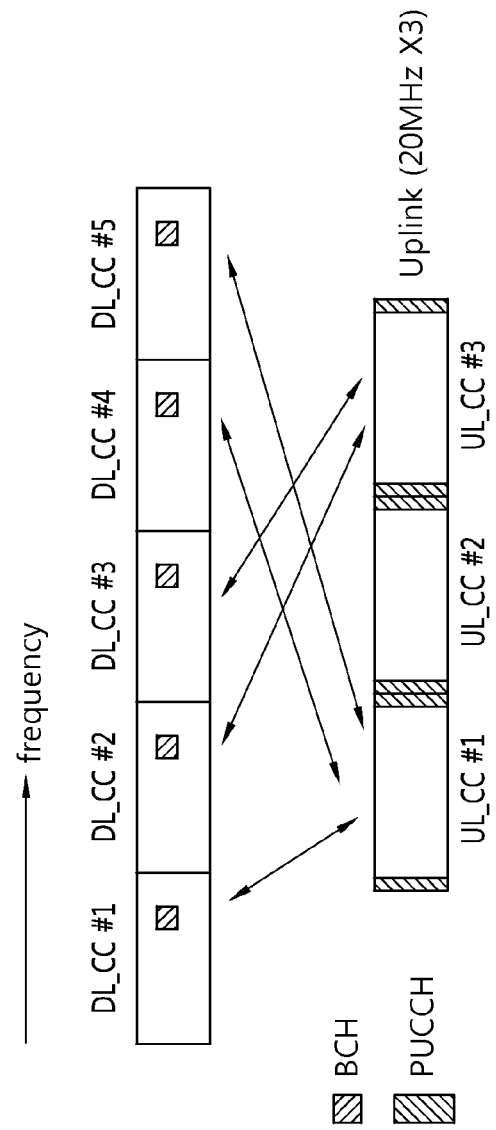
FIG. 12 shows another example in which uplink component carriers and downlink component carriers are mapped in a random access procedure.

FIG. 12 shows another example in which UL_CCs and DL_CCs are mapped in the random access procedure.

Referring to FIG. 12, DL_CCs #1, #4, and #5 on which a random access response is transmitted can be mapped to an UL_CC #1, and DL_CCs #2 and #3 on which a random access response is transmitted can be mapped to an UL_CC #3. Such a mapping relationship can be transferred to a user equipment through mapping information.

As described above with reference to FIGS. 11 and 12, in the case in which a number of DL_CCs on which a random access response is transmitted are mapped to one UL_CC, a user equipment needs to distinguish between the DL_CCs through which one of the DL_CCs will be the random access response received when trying to receive the random access response.

The random access response can be sent from a base station to a user equipment through a DL_CC which is determined based on a random access preamble ID. For example, the number of random access preambles may be 64 in 3GPP LTE. It is assumed that the IDs (or indices) of the respective random access preambles are assigned 0 to 63. Here, in the case in which, as in FIG. 11, a user equipment sends a random access preamble to a base station through the UL_CC #1, the base station may send a random access response through the DL_CC #1 when the ID of the random access preamble is 0 to 19, send the random access response through the DL_CC #2 when the ID of the random access preamble is 20 to 39, and send the random access response through the DL_CC #3 when the ID of the random access preamble is between 40 to 63. That is, the user equipment can determine a DL_CC through which the random access response will be sent on the basis of the ID of the random access preamble.

In FIG. 11, in the case in which the user equipment sends the random access preamble to the base station through the UL_CC #3, the base station may send the random access response through the DL_CC #4 when the ID of the random access preamble is 0 to 30 and send the random access response through the DL_CC #5 when the ID of the random access preamble is 31 to 63.

In the above example, the base station may include information, indicative of a DL_CC through which the random access response will be sent based on an ID of the random access preamble, in mapping information and then send the mapping information. That is, the base station can explicitly indicate a DL_CC through which a random access response will be sent according to a random access preamble ID through mapping information.

In another embodiment, a base station can send the random access response through a DL_CC which is determined according to a resource block index or a subframe index on which a random access preamble is transmitted.

The following table shows an example of a random access configuration.

TABLE 1

| PRACHConfigurationIndex | Preamble Format | System Frame Number | Subframe Number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

TABLE 1-continued

In the above table, the PRACH configuration index can be given to a user equipment as an higher layer signal. A random access preamble format, the type of a radio frame, and a subframe number (that is, a subframe index) which can be applied according to the PRACH configuration index are defined. The embodiment of the present invention can be applied to define a UL_CC through which a random access preamble can be transmitted according to the PRACH configuration index. The embodiment of the present invention can also be applied to define a DL_CC through which a random access response will be transmitted for such a UL_CC.

In the above-described examples, it has been described that a BCH is transmitted in all DL_CCs, and mapping information about an UL_CC through which a user equipment sends a random access preamble and a DL_CC through which a base station sends a random access response is transmitted through a BCH in all the DL_CCs. However, the present invention is not limited to the above description.

For example, although the BCH is transmitted in all the DL_CCs, information about the number of and the frequency bands of UL_CCs, mapping information, and so on can be transmitted only in a BCH which is transmitted through a predetermined one DL_CC (for convenience' sake, called a primary carrier), from among a number of DL_CCs. In this case, a user equipment can know the number of and the frequency bands of UL_CCs based on the BCH received through the primary carrier. In the case in which a number of component carriers are used in the uplink, a user equipment can initiate a random access procedure by sending a random access preamble through component carriers placed at the edges of the component carriers.

The random access response may be transmitted through the primary carrier or other carriers. The random access response can include information about an UL_CC through which a user equipment will send a scheduled message. In this case, the information may indicate an UL_CC through which a random access preamble was sent or other UL_CCs.

Figure 13:
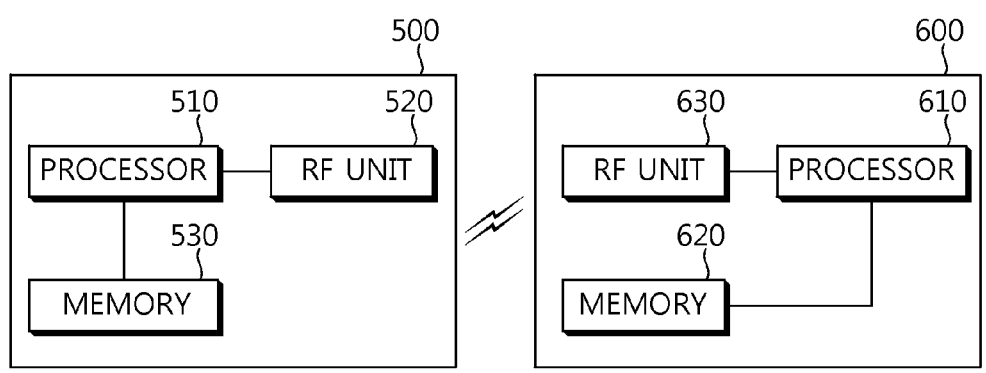
FIG. 13 is a block diagram showing a wireless communication system for implementing embodiments of the present invention.

FIG. 13 is a block diagram showing a wireless communication system for implementing the embodiments of the present invention. A base station 500 includes a processor 510, memory 530, and an RF unit 520. In the above-described embodiments, the procedures, schemes, and functions performed by the base station can be implemented by the processor 510. For example, the processor 510 can determine radio resources (for example, through which UL_CC will be a random access preamble sent) through which a user equipment sends a random access preamble. Furthermore, the processor 510 can determine a mapping relationship between an UL_CC through which a user equipment sends a random access preamble and a DL_CC through which a base station sends a random access response. The processor 510 can send such mapping information through a broadcast channel. The memory 530 is connected to the processor 510 and is configured to store various pieces of information for driving the processor 510. The RF unit 520 is connected to the processor 510 and is configured to transmit and/or receive a radio signal. A base station can become a source station or a destination station.

A user equipment 600 includes a processor 610, memory 620, and an RF unit 630. The processor 610 functions to receive mapping information through a broadcast channel included in any downlink component carrier, send a random access preamble through a specific uplink component carrier, and receive a random access response through a downlink component carrier determined based on the mapping information. Although a user equipment has been described as an example, a relay station can be implemented to have the same construction.

The processor 510 or 610 can include an Application-Specific Integrated Circuit (ASIC), other chipset, a logic circuit and/or a data processing apparatus. The memory 520 or 620 can include Read-Only Memory (ROM), Random Access Memory (RAM), flash memory, a memory card, a storage medium and/or other storage device. The RF unit 530 or 630 can include a baseband circuit for processing a radio signal. In the case in which the embodiments are implemented in software, the above-described schemes can be implemented using a module (process, function, etc.) for performing the above functions. The module can be stored in the memory 520 or 620 and can be implemented by the processor 510 or 610. The memory 520 or 620 can be placed within or outside the processor 510 or 610 and can be connected to the processor 510 or 610 using well-known means.

Although, in the above illustrative system, the methods have been described on the basis of the flowcharts in the form of a series of the steps or blocks, the present invention is not limited to the sequence of the steps, and some of the steps may be performed at different sequences from the remaining steps or simultaneously with them. Further, those skilled in the art will understand that the steps shown in the flowcharts are not exclusive, the steps may include other steps, or one or more steps of the flowcharts may be deleted without affecting the scope of the present invention.

Although some embodiments of the present invention have been described above, those having ordinary skill in the art will appreciate that the present invention may be modified in various forms without departing from the spirit and scope of the present invention. Accordingly, the present invention is not limited to the embodiments and may cover all embodiments within the scope of the claims.

The invention claimed is:

1. A method of a user equipment performing random access in a multi-carrier system, the method comprising:
   receiving mapping information and uplink component carrier (UL CC) information through a broadcast channel (BCH),
   wherein the mapping information includes a mapping relationship between an UL CC on which a random access preamble can be transmitted and at least one downlink component carrier (DL CC) on which a random access response for the random access preamble can be received and wherein the UL CC information indicates a number of UL CCs and frequency bands of the UL CCs;
   selecting a UL CC having a highest frequency band among the UL CCs indicated by the UL CC information;
   transmitting a random access preamble through the selected UL CC, wherein the random access preamble comprises an identifier;
   selecting only one DL CC for receiving a random access response; and
   detecting the random access response at the selected DL CC,
   wherein when the selected UL CC is mapped to only one DL CC according to the mapping information, selected DL CC is the only one DL CC, and
   wherein when the selected UL CC is mapped to a plurality of DL CCs according to the mapping information, the selected DL CC is determined based on a value of the identifier among the plurality of DL CCs.

2. The method of claim 1, further comprising:
   transmitting a scheduled message through radio resources assigned based on the random access response.

3. The method of claim 2, wherein in a case in which information about a UL CC through which the scheduled message will be sent is not included in the random access response, the scheduled message is transmitted through a UL CC through which the random access preamble is transmitted.

4. A user equipment, comprising:
   a Radio Frequency (RF) unit configured to transmit or receive a radio signal; and
   a processor connected to the RF unit,
   wherein the processor is configured to:
      receive mapping information and uplink component carrier (UL CC) information through a broadcast channel (BCH), wherein the mapping information includes a mapping relationship between an UL CC on which a random access preamble can be transmitted and at least one downlink component carrier (DL CC) on which a random access response for the random access preamble can be received and wherein the UL CC information indicates a number of UL CCs and frequency bands of the UL CCs;
      select a UL CC having a highest frequency band among the UL CCs indicated by the UL CC information;
      transmit a random access preamble through the selected UL CC, wherein the random access preamble comprises an identifier;
      select only one DL CC for receiving a random access response; and
      detect the random access response at the selected DL CC,
      wherein when the selected UL CC is mapped to only one DL CC according to the mapping information, the selected DL CC is the only one DL CC, and
      wherein when the selected UL CC is mapped to a plurality of DL CCs according to the mapping information, the selected DL CC is determined based on a value of the identifier among the plurality of DL CCs.

5. The user equipment of claim 4, wherein the specific UL CC is a UL CC placed at a highest band or a UL CC placed at a lowest band among a plurality of UL CCs indicated by the mapping information.

6. The method of claim 1, wherein the value of the identifier is one of 0 to 63.

7. The method of claim 6, wherein when the value of the identifier is included in a range of 0 to 19, the selected DL CC is a first DL CC, and
   wherein when the value of the identifier is included in a range of 20 to 39, the selected DL CC is a second DL CC, and
   wherein when the value of the identifier is included in a range of 40 to 63, the selected DL CC is a third DL CC.

* * * * *